(12) United States Patent
Krautter et al.

(10) Patent No.: US 8,390,440 B2
(45) Date of Patent: Mar. 5, 2013

(54) METHOD FOR DISPLAYING A VISUAL WARNING SIGNAL

(75) Inventors: Wolfgang Krautter, Leonberg (DE);
Michael Dambier, Waghaeusel (DE);
Maria Rimini-Doering, Stuttgart (DE);
Dietrich Manstetten, Ehningen (DE)

(73) Assignee: Robert Bosch GmbH, Stuttgart, DE (US)

( * ) Notice: Subject to any disclaimer, the term of this patent is extended or adjusted under 35 U.S.C. 154(b) by 427 days.

(21) Appl. No.: 12/570,718

(22) Filed: Sep. 30, 2009

(65) Prior Publication Data
US 2010/0079270 A1    Apr. 1, 2010

(30) Foreign Application Priority Data
Oct. 1, 2008   (DE) .................. 10 2008 042 521

(51) Int. Cl.
*B60Q 1/00*    (2006.01)

(52) U.S. Cl. ........ 340/436; 340/435; 340/437; 340/980; 340/575; 340/576; 348/77; 348/333.03; 348/E5.035; 348/E5.045; 348/E5.047; 701/300; 701/301; 701/302

(58) Field of Classification Search .................. 340/436, 340/435, 437, 980, 575, 576; 701/300, 301, 701/302; 348/77, 333.03, E5.035, E5.045, 348/E5.047

See application file for complete search history.

(56) References Cited

U.S. PATENT DOCUMENTS

| | | | |
|---|---|---|---|
| 7,209,833 B2 * | 4/2007 | Isaji et al. | 701/301 |
| 7,400,233 B2 * | 7/2008 | Kondo | 340/435 |
| 7,643,737 B2 * | 1/2010 | Kimata et al. | 396/51 |
| 2004/0150514 A1 * | 8/2004 | Newman et al. | 340/435 |
| 2007/0219709 A1 | 9/2007 | Ikeda | |

FOREIGN PATENT DOCUMENTS

| | | |
|---|---|---|
| DE | 10039795 A1 | 3/2002 |
| JP | 200118717 A | 1/2001 |
| JP | 2006224700 A | 8/2006 |
| WO | 2004049036 A1 | 6/2004 |

* cited by examiner

*Primary Examiner* — Tai T Nguyen
(74) *Attorney, Agent, or Firm* — Maginot, Moore & Beck

(57) ABSTRACT

A method for displaying a visual warning signal to warn a driver of a vehicle about a traffic situation that is determined to be critical. The visual warning signal displayed to the driver is based on sensor data furnished by at least one sensor unit that determines a line of sight of the driver. A display unit for displaying the visual warning signal is selected from a group of at least two separately controllable display units depending on the line of sight of the driver.

14 Claims, 2 Drawing Sheets

METHOD FOR DISPLAYING A VISUAL WARNING SIGNAL

CROSS-REFERENCE TO RELATED APPLICATION

This application is based on German Patent Application 10 2008 042 521.4 filed Oct. 1, 2008.

BACKGROUND OF THE INVENTION

1. Field of the Invention

The invention is based on a method and a control device for displaying a visual warning signal.

2. Description of the Prior Art

In order to warn a driver of a motor vehicle, it is known to issue acoustic and/or visual warnings to the driver. According to the prior art, a visual warning is issued among other things via a head-up display. This displays the warning in the driver's field of vision, which includes the windshield of the vehicle and consequently also the head-up display. In addition, DE 199 51 001 A1 has disclosed using a camera to determine a driver's line of sight so that after determining the line of sight, a warning is displayed in a region of the head-up display toward which the driver's gaze is directed. There is thus a location-dependent display of a warning signal within the head-up display that depends on the driver's line of sight.

A detection of traffic situations and a classification as critical of such a traffic situation detected by means of camera, radar, ultrasonic, or infrared systems with corresponding control devices and algorithms are known from the prior art.

OBJECT AND SUMMARY OF THE INVENTION

The method according to the invention has the advantage over the prior art that a display of a visual warning signal as a warning about a traffic situation determined to be critical is carried out in such a way that from a group of at least two separately controllable display units, a display unit for displaying the visual warning signal is selected depending on the driver's line of sight. This has the advantage that a warning signal about a traffic situation determined to be critical is shown to a driver on a display unit toward which his line of sight is directed.

For example, if the driver's line of sight is directed at a central control console in the course of performing a control task, then a warning signal that appears in a head-up display is not in his line of sight. The driver receives this warning only when he redirects his line of sight away from the control console to the head-up display. Even if in addition to a visual warning signal shown in the head-up display, an acoustic warning to the driver is simultaneously issued in order to prompt the driver to direct his gaze to the head-up display, then he receives the visual warning signal only after changing the direction of his gaze, therefore receiving it in a time-delayed fashion. By contrast, with the selection according to the invention of a display unit, for example the display unit of the control console, the visual warning signal is displayed immediately in the driver's field of vision, i.e. in his line of sight, so that the visual warning signal on the selected display unit warns the driver about a traffic situation determined to be critical, without a time delay. A warning on the head-up display according to the prior art is sometimes not immediately ascertainable to a driver as an explicit warning, whereas the visual warning signal according to the invention, which reaches the driver immediately, makes the driver immediately aware of the critical traffic situation so that the driver already has an increased awareness of the traffic situation surrounding him when he directs his gaze away from the display unit on the control console to the traffic situation surrounding him. Since occasionally in road traffic, a driver must take action within split seconds in critical traffic situations, the method according to the invention makes it possible for a driver to take such actions earlier or more rapidly than with a warning signal displayed in a head-up display according to the prior art.

According to another embodiment of the invention, a single display unit is selected for displaying a visual warning signal. If, for this single display unit, the display unit is selected whose position in the vehicle corresponds the most closely to the direction of the driver's gaze, then the issuing of the visual warning signal via this single display unit shows the driver a warning on only a single display unit so as not to unsettle him with a plurality of warnings on various display units.

According to another embodiment of the invention, in order to display the visual warning signals, respective display units are triggered via respective separate interfaces for supplying image data. This has the advantage that it is possible not only for a single display unit to be used for issuing a visual warning signal but also for different display units present in the motor vehicle to be triggered by their own respective separate interfaces. A triggering of this kind makes it possible for image data to be supplied to the display units and displayed by means of them. It is thus possible to use various display units present in the motor vehicle, which offers the advantage over the prior art that the visual form of the visual warning signal, i.e. the image itself, is determined based on the supply of image data. Preferably, the respective display units serve only to display a supplied image. This makes it possible to achieve a high degree of flexibility with regard to the visual warning signals or images to be displayed so that the form of the depiction is not determined by the display units, but rather by the supplied image data.

According to another embodiment of the invention, a first sensor unit is an image capture unit that furnishes first sensor data in the form of image data. Sensor data of this kind in the form of image data from an image capture unit (for example a camera) can be evaluated, as is known from the prior art, in such a way that it is possible to determine the driver's line of sight. According to another embodiment of the invention, the first sensor unit is an image recognition unit that furnishes first sensor data in the form of the driver's line of sight. Such image recognition units can, for example, include a combination of an image capture unit in the form of a camera and a control device for image recognition; the control device determines the driver's line of sight based on the image data furnished by the image capture unit and then furnishes first sensor data in the form of this line of sight. In addition, another, second sensor unit is preferably comprised of at least one control mechanism, which is to be operated by a driver and furnishes additional sensor data in the form of data relating to the control task being performed by the driver. This has the advantage that not only is a driver's line of sight determined through an evaluation of image data furnished by image capture units, but also additional sensor data, which are furnished by control mechanisms, are evaluated in such a way that it is possible to determine the driver's line of sight. If, for example, a high level of control activity has been detected at a rotary push button in the vicinity of the center console of a vehicle, it is then possible to use these additional sensor data to carry out a plausibility check or a check of a line of sight that is known based on image data. This achieves an advantageous higher degree of certainty when making a decision with regard to a determined line of sight of a driver.

According to another embodiment of the invention, the visual warning signal is a sample image of a traffic situation, a sample video sequence of a traffic situation, a real image of a current traffic situation of the vehicle, or a real video sequence of a current traffic situation of the vehicle. This provides the advantage that by means of different forms of image data, there are various possible ways to make the driver aware of a traffic situation determined to be critical. If, for example, a sample image of a traffic situation is shown, then such an image, for example a pictogram, makes it possible for a driver to easily comprehend the critical nature of the traffic situation. A display of a real image or a real video sequence of a current traffic situation of the vehicle has the advantage that the driver receives a display of the current traffic situation of the vehicle without changing his line of sight. He is thus able to take actions for controlling the vehicle, even during the moment in which he is shifting the direction of his gaze from the display unit to the current traffic situation.

According to another embodiment of the invention, the visual warning signal is selected depending on the determined type of the critical traffic situation. This has the advantage that through a classification of a critical traffic situation as a certain type of traffic situation, it is possible to influence which type of visual warning signal is displayed. As a result, depending on the critical traffic situation or the classified type of traffic situation, it is possible to select different warning signals that make it possible to immediately inform the driver about the type of traffic situation currently present.

According to another embodiment of the invention, the display unit is a head-up display, a display unit of an instrument cluster, a display unit of a navigation device, a display unit of a head unit, a display unit of a mobile phone, or a display unit of a mobile computing device. This has the advantage that various display units present in a motor vehicle, which are connected to a central control unit via interfaces, can be used for issuing the visual warning signal and a number of display units of such devices can be used.

According to another embodiment of the invention, after the driver actuates an input unit, the display of the visual warning signal is terminated. This is advantageous since occasionally, the display unit issues a warning about a traffic situation determined to be critical, even though a driver is already aware of this detected traffic situation. By actuating the input unit, the driver can terminate the display of the visual warning signal if so desired. This can be the case, for example, when the driver wishes to no longer be distracted by the visual warning signal.

The control unit according to the invention for selecting a display unit from a group of at least two display units to display a visual warning signal in order to warn a driver of a vehicle about a critical traffic situation has various interfaces. The control unit has at least one first interface for triggering a first display unit and at least one additional, second interface for triggering an additional, second display unit. The control unit also has a third interface connected to at least one sensor unit that furnishes sensor data based on which the control unit determines a driver's line of sight. Furthermore, the control unit has a fourth interface connected to a detecting unit for detecting a critical traffic situation; the detecting unit signals the control unit when a critical traffic situation has been detected. The control unit is characterized in that when the control unit receives the signal that a critical traffic situation has arisen, the control unit selects one of the display units to display the visual warning signal, making this selection based on the driver's line of sight. The control unit according to the invention has the advantage over the prior art that the display of a visual warning signal is not limited only to a certain region of a head-up display, but instead, the visual warning signal is displayed on a display unit selected from among at least two display units. According to another embodiment of the control unit, preferably a single display unit is selected. This has the advantage that by selecting a single display unit to display the visual warning signal, the control unit assures that the driver is shown the visual warning signal in only a single location in the motor vehicle so that the driver is not distracted or irritated by a plurality of visual warning signals of a single warning.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
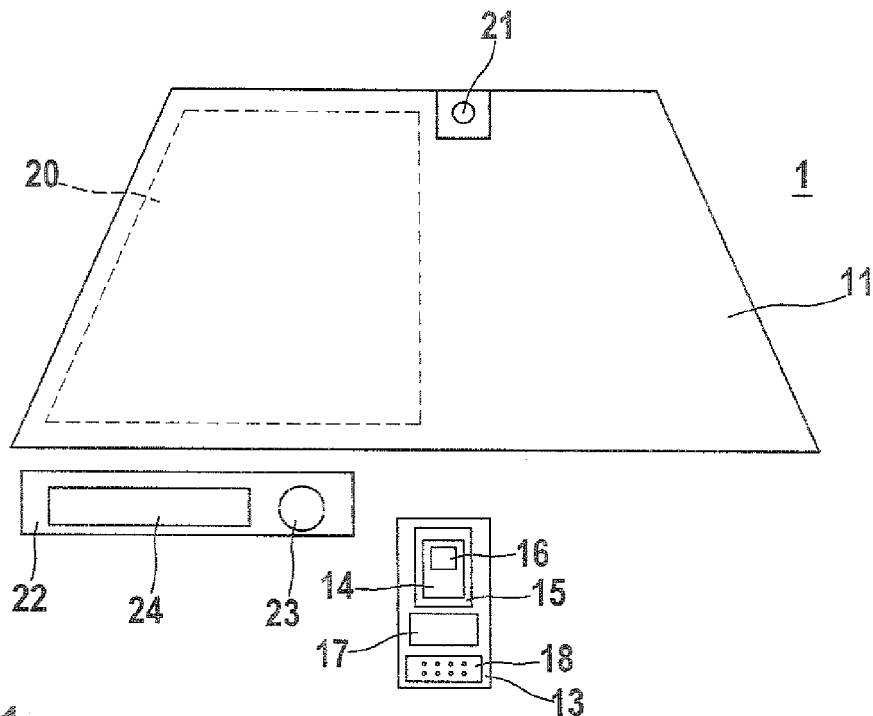
FIG. 1 shows a motor vehicle interior from a driver's point of view.

FIG. 1 shows a motor vehicle interior 1 from a driver's point of view. The drawing shows a windshield 11, within which a region 20, depicted with a dashed line, is provided as a display region of a head-up display. In addition, below the windshield 11, there is an instrument cluster 22, which preferably has a speedometer 23 and a display unit 24 for displaying image data. In the central region, toward the middle of the motor vehicle interior 1, there is preferably also a central control console 13, for example a head unit that preferably contains a navigation device, a radio, a CD player, an airconditioner, or similar devices. These devices are preferably controlled by means of a control mechanism 18 of the central control console 13. The at least one control mechanism 18 can, for example, be a keyboard, a rotary push button, a trackball, or similar control mechanisms. The central control console 13 also has a display unit 17 for displaying information, for example belonging to the navigation device, the CD player, the air-conditioning system, or other devices. Preferably, the central control console 13 also contains a cradle 15 for holding a mobile phone 14. The mobile phone 14 also has its own display unit 16. Alternatively, it is possible for the cradle 15 to be provided not in the central control console 13, but in another region of the motor vehicle interior 1. Preferably, other mobile computing devices not shown in FIG. 1 are also provided, which also have display units in the form of screens.

According to the invention, in order to display a visual warning signal, one of the display units/region 16, 17, 24, 20 is selected depending upon the driver's line of sight. In this connection, a sensor unit 21, preferably a camera in the upper, middle region of the windshield 11, furnishes sensor data based on which the driver's line of sight is determined. Preferably, the camera is situated at another position in the vehicle, for example in an instrument cluster of an instrument panel.

Figure 2:
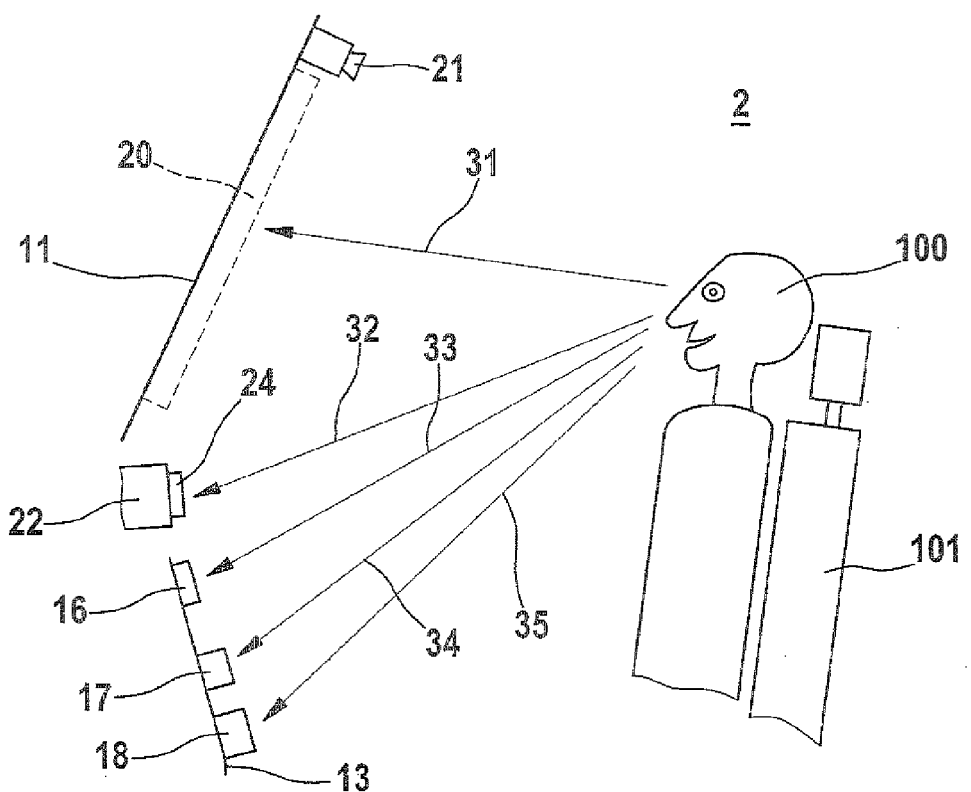
FIG. 2 is a side view of such a motor vehicle interior.

The motor vehicle interior 1 shown in FIG. 1 is in turn depicted as a motor vehicle interior 2 shown in a side view in FIG. 2. Here, too, the windshield 11 is depicted with a region 20 serving as a display region of a head-up display. The drawing also shows an instrument cluster 22 with a display unit 24 as well as a central control console 13 with a display unit 17 and preferably a control mechanism 18. Preferably, a mobile phone with a display unit 16 is situated in the central control console 13. A sensor unit 21 in the form of a camera is preferably provided in the upper region of the windshield 11. A driver 100 sits in a seat 101 and can have various lines of sight according to FIG. 2. The lines of sight are indicated by respective arrows 31 through 35 leading from the driver's eyes to the various respective display region/units 20, 24, 16, 17. A first line of sight 31 of the driver leads from the driver's eyes to the head-up display 20. A second line of sight 32 of the driver leads to the display unit 24 of the instrument cluster 22. A third line of sight 33 of the driver leads to a display unit 16 of a mobile phone. A fourth line of sight 31 of the driver leads to a display unit 17 of a central control console 13, for example of a head unit. The display units shown and mentioned in this exemplary embodiment represent only a selection of possible display units that can be triggered to display a visual warning signal in accordance with the method according to the invention. The fact that other display units present in a motor vehicle can be used to display a visual warning signal is comprehensible to those skilled in the art. The display units shown are each connected by means of a respective interface to a central control unit, which is not shown here, so that the display units can be triggered to display the visual warning signal. Interfaces of this kind—or more precisely stated data interfaces for transmitting image data—can, for example, be embodied in the form of a CAN bus, hard-wired interfaces, or wireless interfaces, e.g. in the form of USB interfaces of WLAN interfaces.

If detection units not shown in the figures—for example cameras aimed at the surroundings, radar systems, infrared systems, or ultrasonic systems—and a corresponding control unit determine a traffic situation to be critical, then it is necessary to warn the driver of this traffic situation by displaying a visual warning signal. According to the prior art, it is possible in this context to make a visual warning signal appear in various subregions of a head-up display 20. However, if the driver is looking not at the head-up display 20, but instead at one of the other display units 24, 16, 17, then even if the driver's awareness is drawn to this visual warning signal by an additional acoustic warning, it only reaches him in a time-delayed fashion because the visual warning signal is only perceptible to him if he takes his eyes off the other display units 24, 16, 17 and directs them to the head-up display 20. Sometimes this causes the loss of several split seconds before the driver can react, which is sometimes extremely critical in road traffic.

The sensor unit 21 furnishes sensor data based on which the driver's line of sight can be determined. For example, these sensor data can be image data that are evaluated by a central control unit so as to determine a line of sight. Alternatively, the sensor unit 21 can be a unit that furnishes first sensor data in the form of the driver's line of sight; in this case, the sensor unit 21 is an image recognition unit that automatically carries out an evaluation of image data. If the driver's line of sight has been determined, then in a situation in which the driver is looking at the display unit 17 of the central control console 13, for example, the display of the visual warning signal is made to appear on the display unit 17 of the control console 13. As a result, the driver is presented with the visual warning signal immediately so that the driver is informed of the fact that critical traffic situation has arisen even before the driver 100 changes his line of sight from the line of sight 34 directed at the display unit 17 to the line of sight 31 directed at the windshield 11.

Preferably, an acoustic warning can also be issued together with the issuing of the visual warning signal on a display unit that is selected depending on the driver's line of sight. Preferably, out of the display region/units 20, 24, 16, 17 present in the motor vehicle interior 1, a single display unit is selected for displaying the visual warning signal so that the driver is not irritated by a plurality of warning signals on a plurality of display units.

Preferably, the sensor units for furnishing sensor data also include control mechanisms, for example the control mechanism 18 of the central control console 13, which furnish data with regard to a control task being performed by the driver. To this end, the control mechanism 18 is likewise connected to a central control unit via an interface for transmitting the sensor data about the control task being performed by the driver.

Control mechanisms can preferably also include a steering wheel whose actuation by the driver 100 is evaluated by a control unit. Here, too, it is necessary for sensors in the steering wheel to be connected to the central control unit via interfaces for transmitting a control task being performed by the driver.

Preferably, the visual warning signal is a sample image or a sample video sequence of a traffic situation. Such sample image displays have the advantage that through an abstract depiction of image information, e.g. by means of pictograms, a driver can be shown a corresponding warning in a manner that is easily comprehensible to him. These sample image displays can also be displayed depending on the critical traffic situation classification type into which the detected traffic situation falls. For example, if a critical traffic situation has been detected in which a pedestrian is crossing the road, then a corresponding sample image or sample video sequence of a pedestrian on a road can be selected as the visual warning signal and shown to the driver. If a traffic situation determined to be critical has arisen, for example a red traffic signal, then a sample depiction of a red traffic signal as a sample image can be selected as the visual warning signal. Other types of traffic situations can, for example, include a traffic situation with a cyclist, an approach to an intersection, a preceding vehicle that is braking, or a vehicle that is cutting into the lane.

Preferably, the visual warning signal is a real video sequence of a current traffic situation of the vehicle or a real image of a current traffic situation of the vehicle. Such a real image or real video sequence can, for example, be captured by cameras aimed at the surroundings and the driver can be shown the current traffic situation on a display unit that is currently in his line of sight, without requiring the driver to first shift the direction of his gale to the windshield 11. Likewise, if the vehicle is equipped with a night vision system, then it is possible for such an image in the form of a real image or real video sequence to be displayed on the night vision system.

Preferably, the display of the visual warning signal is terminated when the driver actuates an input unit. It is thus possible for the driver to automatically terminate the visual warning signal if he feels distracted by the visual warning signal or considers it to be no longer important.

If the driver does not actuate the input unit, then the visual warning signal is preferably terminated at the latest, after the traffic situation that has been determined as critical has ended and at the earliest, upon detection of a driver reaction that is appropriate to the situation.

Figure 3:
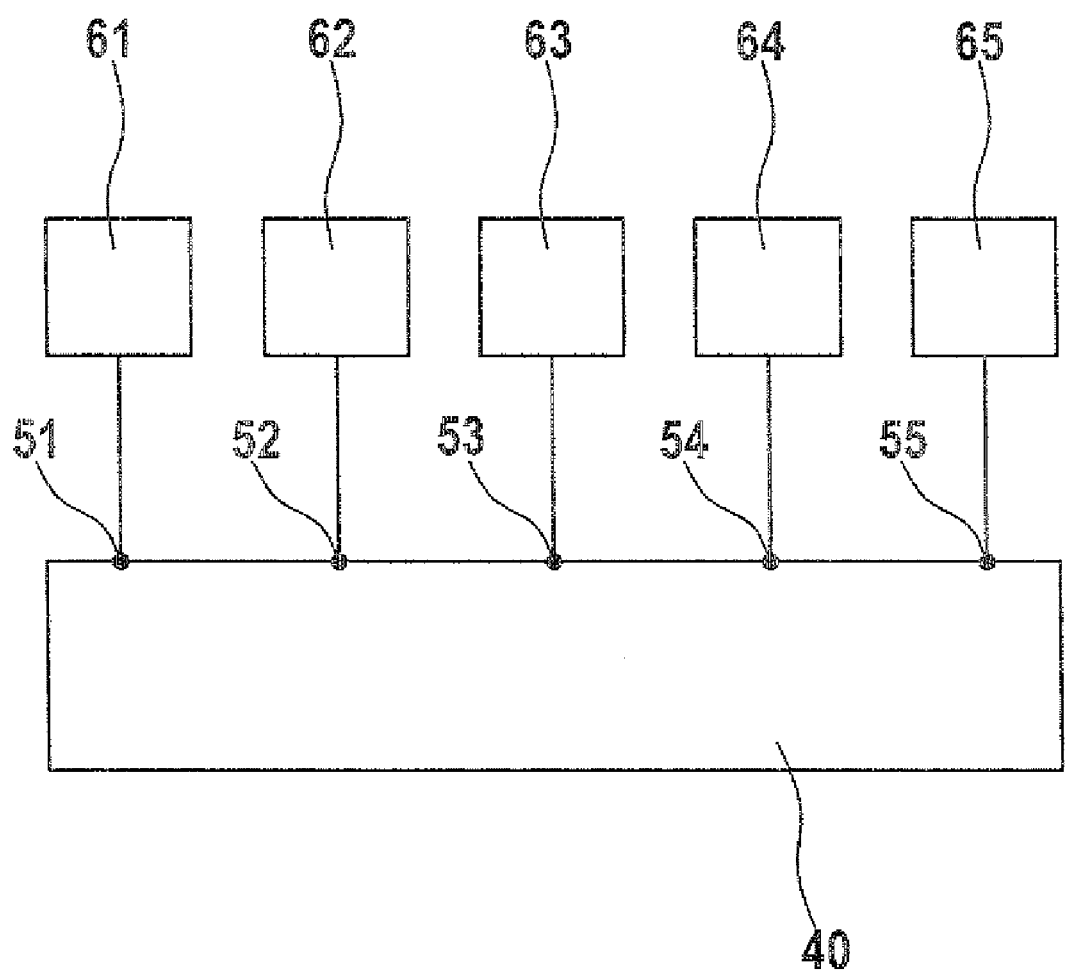
FIG. 3 shows a control unit according to the invention.

FIG. 3 shows a control unit 40 according to the invention, which is connected via a first interface 51 to at least one first display unit 61. The control unit 40 is also connected via a second interface 52 to at least one second display unit 62. Preferably, it is also possible for the control unit 40 to be connected via additional interfaces to additional display units. The control unit 40 is connected via a third interface 53 to a sensor unit 63. The sensor unit 63 furnishes sensor data based on which the control unit 40 determines the driver's line of sight. The control unit 40 is connected via a fourth interface 54 to a detection unit 64 for detecting a critical traffic situation. If the detection unit 64 signals the control unit 40 that a critical traffic situation has been detected, then the control unit 40 determines the driver's line of sight based on the sensor data of the sensor unit 63 and, depending on the line of sight, selects one of the display units 61, 62 to display a visual warning signal. Preferably, the control unit 40 selects a single display unit.

The control unit 40 here preferably controls the display units 61, 62 via the respective interfaces of the display units 61, 62, with the visual warning signal being transmitted in the form of signal data for the issuance of a warning signal or in the form of image data. If sample images or sample video sequences are supplied as image data to the display units 61, 62, then the control unit 40 here can include a memory in which such sample image data are stored. Preferably, the control unit 40 has a fifth interface 55 connected to an image capture unit 65, which can, for example, be a camera aimed at the surroundings or a camera of a night vision system. The control unit 40 can preferably supply image data from such an image capture unit 65 to the display units 61, 62 in the form of real images or real video sequences. The display units 61, 62 can preferably be display units that are shown in FIG. 1 or 2 and have been described above in conjunction with them.

The embodiments shown and described in the exemplary embodiments can not only be embodied separately in and of themselves, but can also be combined with one another to achieve additional advantages.

The foregoing relates to preferred exemplary embodiments of the invention, it being understood that other variants and embodiments thereof are possible within the spirit and scope of the invention, the latter being defined by the appended claims.

We claim:

1. A method for displaying a visual warning signal to warn a driver of a vehicle that a traffic situation is critical, the method comprising:
    determining a line of sight of the driver based on sensor data furnished by at least one sensor unit, the at least one sensor unit having a first sensor unit embodied as an image capture unit or an image recognition unit and a second sensor unit which includes at least one control mechanism to be operated by the driver;
    furnishing a control unit with first sensor data representing image data from the image capture unit or first sensor data representing the line of sight of the driver from the image recognition unit;
    furnishing the control unit with additional sensor data from the second sensor unit relating to a control task being performed by the driver;
    selecting a display unit for displaying the visual warning signal depending on the line of sight from a group of at least two separately controllable display units; and
    terminating the display of the visual warning signal after the driver actuates an input unit.

2. The method as recited in claim 1, further comprising selecting a single display unit.

3. The method as recited in claim 2, further comprising triggering respective display units via respective separate interfaces for supplying image data in order to display the visual warning signal.

4. The method as recited in claim 2, wherein the visual warning signal is a sample image of a traffic situation, a sample video sequence of a traffic situation, a real image of a current traffic situation of the vehicle, or a real video sequence of a current traffic situation of the vehicle.

5. The method as recited in claim 4, further comprising selecting the visual warning signal based on a determined type of the critical traffic situation.

6. The method as recited in claim 1, further comprising triggering respective display units via respective separate interfaces for supplying image data in order to display the visual warning signal.

7. The method as recited in claim 6, wherein the visual warning signal is a sample image of a traffic situation, a sample video sequence of a traffic situation, a real image of a current traffic situation of the vehicle, or a real video sequence of a current traffic situation of the vehicle.

8. The method as recited in claim 7, further comprising selecting the visual warning signal based on a determined type of the critical traffic situation.

9. The method as recited in claim 8, wherein the display unit is a head-up display, a display unit of an instrument cluster, a display unit of a navigation device, a display unit of a head unit, a display unit of a mobile phone, or a display unit of a mobile computing device.

10. The method as recited in claim 1, wherein the visual warning signal is a sample image of a traffic situation, a sample video sequence of a traffic situation, a real image of a current traffic situation of the vehicle, or a real video sequence of a current traffic situation of the vehicle.

11. The method as recited in claim 7, further comprising selecting the visual warning signal based on a determined type of the critical traffic situation.

12. The method as recited in claim 1, wherein the display unit is a head-up display, a display unit of an instrument cluster, a display unit of a navigation device, a display unit of a head unit, a display unit of a mobile phone, or a display unit of a mobile computing device.

13. A control unit for selecting a display unit from a group of at least two display units for displaying a visual warning signal in order to warn a driver of a vehicle of a critical traffic situation, the control unit comprising:
    at least one first interface for triggering a first display unit;
    at least one second interface for triggering a second display unit;
    a third interface connected to at least one sensor unit, the at least one sensor unit furnishing sensor data which the control unit uses to determine a driver's line of sight;
    a fourth interface connected to a detecting unit for detecting a critical traffic situation, and
    a fifth interface connected to an image capture unit for supplying image capture data of a real image or a real video sequence of a current traffic situation to the display units,
    wherein the detecting unit signals the control unit when a critical traffic situation has been detected, and when the control unit is signaled by the detecting unit that a critical traffic situation has arisen, the control unit selects one of the display units to display the visual warning signal depending on the line of sight of the driver.

14. The control unit as recited in claim 13, wherein the control unit selects a single display unit to display the visual warning signal.

* * * * *

UNITED STATES PATENT AND TRADEMARK OFFICE
CERTIFICATE OF CORRECTION

| | |
|---|---|
| PATENT NO. | : 8,390,440 B2 |
| APPLICATION NO. | : 12/570718 |
| DATED | : March 5, 2013 |
| INVENTOR(S) | : Krautter et al. |

It is certified that error appears in the above-identified patent and that said Letters Patent is hereby corrected as shown below:

In the claims:

Claim 11, (col. 8, line 31):

Replace "in claim 7, further" with -- in claim 10, further --

Signed and Sealed this
First Day of October, 2013

Teresa Stanek Rea
*Deputy Director of the United States Patent and Trademark Office*